Dec. 12, 1933.   T. G. NYBORG   1,939,514
JIGGING CONVEYER
Filed Sept. 26, 1932

INVENTOR
T. G. Nyborg
BY
ATTORNEY

Patented Dec. 12, 1933

1,939,514

UNITED STATES PATENT OFFICE 1,939,514

JIGGING CONVEYER

Tage Georg Nyborg, Meco Works, Worcester, England, assignor of one-half to The Mining Engineering Company Limited, Meco Works, Worcester, England Application September 26, 1932, Serial No. 634,970, and in Great Britain October 1, 1931

5 Claims. (Cl. 198—220)

This invention relates to jigging conveyers in which troughed sections are connected together.

Various forms of non-detachable connections for such sections have been proposed and the object of the present invention is to provide a particularly cheap, convenient and secure connection of this description.

The connection according to the present invention comprises a bolt having its end turned back to form a U or hook. The bolt lies within an eye on one section of trough and this eye may conveniently be formed closed or semi-closed by bending a strap attached to one end of the section. The straight end of the bolt is provided with an adjusting nut which is adapted to be tightened against the eye, and the hooked end of the bolt lies along on the outside of an eye or strap secured to the second trough section and the actual hook or turn-back portion engages inside this latter strap or eye. Two parallel portions of the bolt forming the main stem and the hook respectively thus engage the straps formed upon the two adjacent sections, and the two sections are drawn tightly together when the nut is tightened up. A lock nut may be provided, or preferably, the adjusting nut may be an out-of-balance nut. It is preferred to provide a split pin at the end of the threaded portion of the bolt, or otherwise to prevent the nut or nuts from being altogether removed from the bolt.

In order to disconnect the trough sections, the nut or nuts are slacked off until the hooked portion can be disengaged from its eye or strap; the hook bolt is then turned through a sufficient distance to enable the sections to be drawn apart.

In order that the invention may be clearly understood, a connection for conveyer sections in accordance with it will now be described by way of example with reference to the accompanying drawing, wherein.

As illustrated, there is attached to the conveyer section $A_1$, a strap B which is bent to form a partially closed eye D. A bolt E is carried in the eye D and is provided at one end with a hook F, and at the other with screw threads G for the reception of an adjusting nut H and a lock nut J. A split pin K is provided for retaining the nuts upon the bolt.

To the adjacent strap $A_2$ is attached a strap C, which, in the form illustrated, is bent to form the partially closed eye L. When the joint is made, the straight portion of the bolt E passes along the outside of the eye L and the hook F engages inside the eye. When it is desired to disconnect the sections, it is necessary only to slacken off the nuts until the hooked end of the bolt can be disengaged from the eye L and turned to allow the sections to be drawn apart.

It will be noted that the bolt cannot be removed from the closed or semi-closed eye through which it passes since the hook portion lies outside one end of the eye and the nuts outside the other, and is thus anchored to the trough section.

The so-called eye on the second conveyer section need not be of any particular form so long as it is adapted to be engaged by the hook and for this purpose it may conveniently have a corner or the equivalent which lies on the same level as the eye on the other section. It is preferable also that the space between the two limbs of the hook is equal to the thickness of the material of the eye or the like against which it accordingly engages on both sides.

Figure 1:
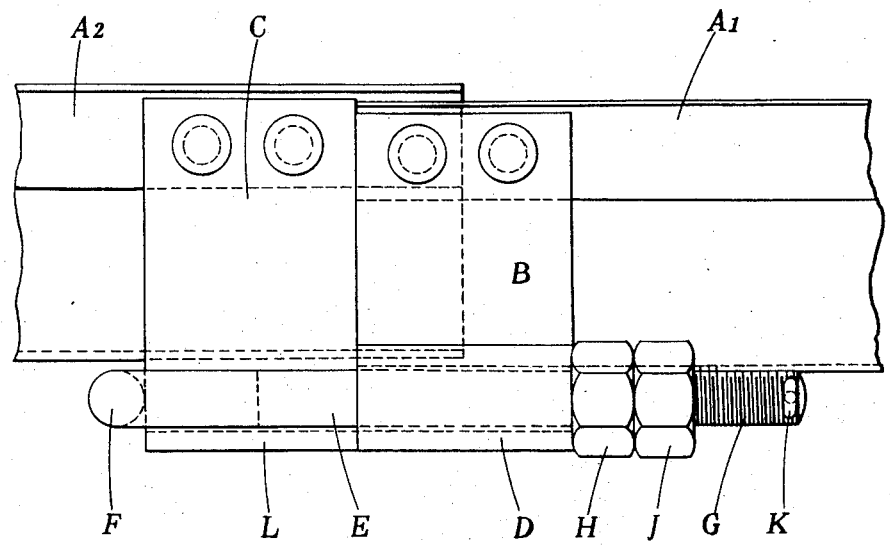
Figure 1 shows in side elevation a joint between adjacent conveyer sections.
Figure 3:
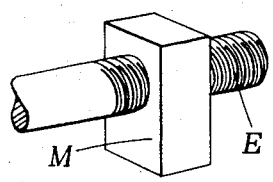
Figure 3 shows a modified detail in perspective view.
Figure 2:
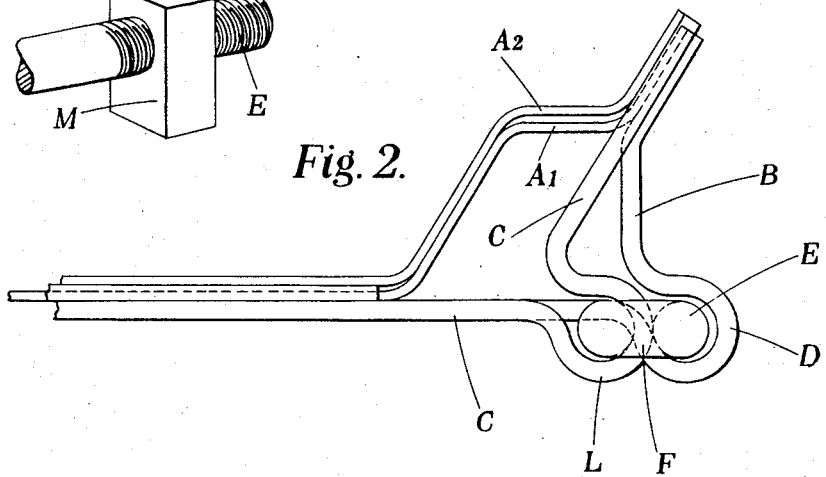
Figure 2 shows the joint on one side in end elevation.

In the arrangement described above, there are illustrated adjusting and locking nuts; it is preferred, however, to employ as the adjusting nut an out-of-balance nut as shown at M in Figure 3, since this will not slack off so readily as an ordinary locked nut.

I claim:—

1. A connection for adjacent sections of jigging conveyers comprising an eye upon each of said sections, a bolt with a hooked end having its main limb passing through one of said eyes and along the outside of the other of said eyes, the hooked end of the bolt entering the last mentioned eye, and means being provided for tightening up the bolt to draw the sections together.

2. A connection for adjacent sections of jigging conveyers comprising the part claimed in claim 1, the eye entered by the hook being formed by the corner of a strap.

3. A connection for adjacent sections of jigging conveyers comprising an eye atached to one section, a second eye attached to the other section and positioned out of alignment with the first mentioned eye, a bolt passing through one of said eyes and along the outside of the other of said eyes, the bolt being formed with a hook, the return end of the hook engaging in the last mentioned eye, and means being provided for tightening up the bolt to draw the sections together.

4. A connection for adjacent sections of jigging conveyers comprising an eye upon each of said sections, the eyes being disposed in non-registering relation, a bolt passing through one of said eyes and along the outside and in contact with the other of said eyes and having its end bent backward parallel to its length, this bent portion engaging in the last mentioned eye, and an out-of-balance nut on the straight end of the bolt for tightening up the joint and drawing the sections together in alignment.

5. A connection for adjacent sections of jigging conveyers comprising an eye upon one section, a second eye upon an adjacent section and positioned out of alignment with the first mentioned eye, one of the eyes carrying a bolt with a hooked end, the bolt being adapted to pass along the outside of the other of the said eyes and the hooked end of the bolt to enter the last mentioned eye, and an out-of-balance nut on the bolt for drawing up the bolt and tightening the sections together.

TAGE GEORG NYBORG.